Oct. 21, 1969 YOSHIYO WADA 3,474,195

APPARATUS FOR GUIDING AND DRIVING A TAPE FOR MAGNETIC RECORDING AND REPRODUCING IN OBLIQUE TRACKS

Filed Nov. 29, 1965 5 Sheets-Sheet 1

INVENTOR

YOSHIYO WADA

BY

TORNEY

INVENTOR
YOSHIYO WADA

BY Louis Bernat
ATTORNEY

INVENTOR
YOSHIYO WADA

BY
Louis Bernat
ATTORNEY

INVENTOR
YOSHIYO WADA

BY

Louis Bernat
ATTORNEY

INVENTOR
YOSHIYO WADA

BY

Louis Bernat
ATTORNEY 3,474,195

APPARATUS FOR GUIDING AND DRIVING A TAPE FOR MAGNETIC RECORDING AND REPRODUCING IN OBLIQUE TRACKS

Yoshiyo Wada, Kawasaki, Japan, assignor to Victor Company of Japan, Limited, Moriya-cho, Kanagawa-ku, Yokohama, Japan, a corporation of Japan Filed Nov. 29, 1965, Ser. No. 510,287
Claims priority, application Japan, Nov. 28, 1964, 39/66,625; Dec. 28, 1964, 40/73,439, 40/73,440, (utility model) 101,415
Int. Cl. G11b *5/02, 5/78*
U.S. Cl. 179—100.2 10 Claims

ABSTRACT OF THE DISCLOSURE

A magnetic tape recorder for recording and playing back TV signals, the recordings being made on oblique tracks on the tape. The tape partially wraps around a pair of coaxially mounted cylindrical guide drums which are linearly displaced and separated by a gap. The recording heads are mounted on a disk which rotates in the gap. Instead of a capstan, the tape is driven by rotating the drums. Tape entraining means and pressure applying means prevent displacement of the tape.

This invention relates to an apparatus for magnetic recording and reproducing a video signal such as, for example, a television signal which is recorded on and reproduced from oblique tracks on a magnetic tape medium, with one or more fields or frames being recorded on and reproduced from each track.

In a usual magnetic recording and reproducing apparatus, the guide drum for the magnetic tape is fixed. Usually, the magnetic medium is driven and advanced by a capstan which is separate at a position which is removed from the guide drum. Such usual systems have a number of defects, as follows:

(1) As the magnetic medium is wound on the fixed guide drum surface, the friction between the magnetic medium and guide drum surface becomes great. Therefore, a high tape tension is needed for advancing the magnetic medium. Variations in the friction between the tape and drum produce great variations in the tape tension which produces an elongation and contraction phenomena in the magnetic medium. These phenomena increase the amount of jitter which is generated and exert a bad influence upon the appearance of a reproduced picture.

(2) Since the capstan is small in diameter, any mechanical eccentricity and aberrations, or the like, produce velocity variations at a rapid rate.

This invention was evolved with the general object of overcoming the defects described above. Another object is to provide magnetic recording and reproducing apparatus which is readily manufactured with a high mechanical accuracy, which is easily assembled, and which is small in size.

Another object of this invention is to provide magnetic recording and reproducing apparatus in which the jitter generated by the running of the magnetic medium is reduced to a minimum value so that the video signal can be recorded or reproduced faithfully and effectively on the magnetic medium.

According to this invention, a magnetic recording and reproducing apparatus is provided in which the diameter of the capstan can be made larger than the diameter of the capstan of the conventional apparatus. This object is accomplished by using a rotary guide drum means as the capstan. This use of a large diameter drum overcomes the disadvantage of prior systems, and achieves the above stated objectives.

Important features of the invention reside in particular arrangements for driving the rotary guide drum means, and more particularly in arrangements for pressing this tape against a guide drum means also used for guiding the tape.

Further, features and advantages will be apparent from the following explanation with reference to the drawings.

Figure 1:
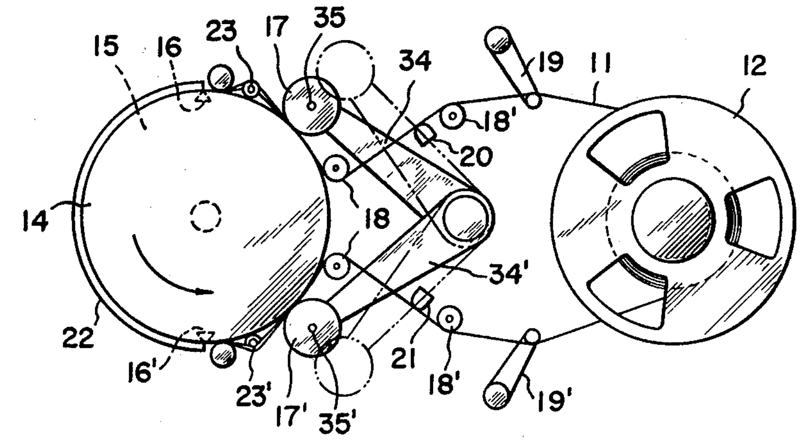
FIG. 1 is a plan view of one preferred embodiment of a magnetic recording and reproducing apparatus constructed according to this invention.

Referring to the drawings, a magnetic medium is shown in the form of a tape 11 which is moved to a take-up reel 12 from a supply reel 13. The tape is trained about a rotary guide drum 14 having separate upper and lower portions. A rotary magnetic head plate 15 is inserted between the upper and lower rotary guide drum portions. Recording or reproducing heads 16 and 16' are carried by the plate 15.

Idlers 17 and 17' are either pressed toward the rotary guide drum 14 with a suitable pressure, or are released therefrom. Guide rollers 18 and 18' operate to guide the magnetic tape 11 and tension arms 19 and 19' apply suitable tension. An erasing head 20 and an audio head 21 engage the tape before and after it engages the drum 14. A tape guide 22 is provided adjacent the drum 14. Conically shaped poles 23 and 23', interposed between the guide drum 14 and the magnetic tape 11, provide the proper running angle of the tape.

The magnetic tape 11, taken from the supply reel 13, is trained on the rotary guide drum 14 for approximately 180°. The tape is supplied to the drum via the tension arm 19', guide rollers 18 and 18', and idler 17', and is led to the take-up reel 12 via the other guide idler 17, guide rollers 18 and 18', and tension arm 19.

Figure 2:
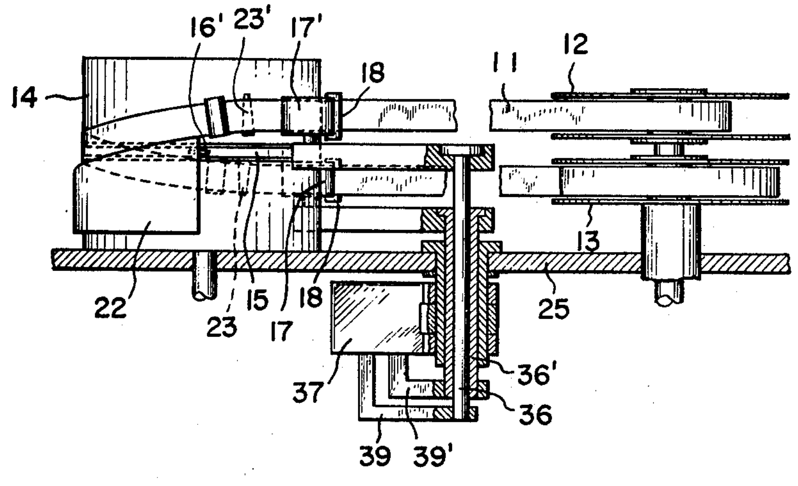
FIG. 2 is a side view of the apparatus shown in FIG. 1.
Figure 3:
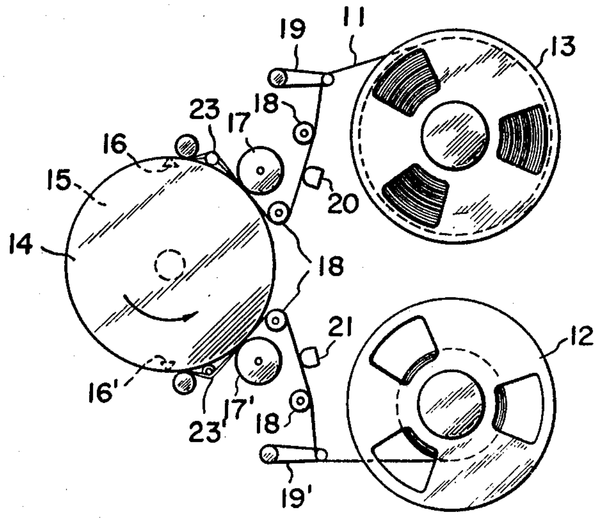
FIG. 3 is a plan view showing another preferred embodiment of magnetic recording and reproducing apparatus constructed according to this invention, wherein supply and take-up reels are mounted side by side and are not overlapped as shown in FIG. 1.

FIGURES 1 and 2 are a plan view and a side view illustrating one embodiment of the apparatus constructed according to this invention. FIGURE 3 shows another embodiment. The difference between the two embodiments is that, in the embodiment of FIGURES 1 and 2, the take-up reel is located coaxially above the supply reel 13, while in the embodiment of FIGURE 3 they are on separate axes.

The magnetic tape 11 travels obliquely over the outer peripheral surfaces of the rotary guide drum 14. The contacting position between the tape and the drum may be displaced upwardly or downwardly according to the rotation of the drums. Accordingly, a supporting guide 22 is provided in order to prevent the displacement of the contacting position of this magnetic tape 11. For example, this tape displacement may be directed downwardly owing to the rotation of the rotary guide drum 14. The supporting guide 22 may be provided on the lower edge of the magnetic tape 11 as shown in FIGS. 4 to 10 and as described later. When the idlers 17, 17' press the magnetic tape 11 against the rotary guide drum 14, while the tape is positioned obliquely on the drum, the tape may be shifted upwardly or downwardly following the rotation of the rotary drum as described above. The conically shaped poles 23, 23' are arranged to establish the running angle of the tape, and they are interposed between the rotary guide drums 14 and the magnetic tape 11 as shown in FIGS. 1 to 3. The running direction of the magnetic tape 11 is perpendicular to the axis of the rotary guide drums 14. In this state, the idlers 17 and 17' press the magnetic tape 11 against the drum.

In the illustrated constructions, when the rotary guide drum 14 is rotated, the magnetic tape 11 is driven by the drum 14 and is taken-up by the take-up reel 12. On the portion of the tape which happens to be positioned between the upper and lower potrions of the drum 14, recording of the video signal is formed in oblique traces by the rotary magnetic heads 16 and 16' which are interposed between the portions of the drum. After it is rewound, the recorded magnetic tape 11 may be played back, in substantially the same manner as in recording as described later. The rotary magnetic heads 16 and 16' are used for the playback reproduction.

To facilitate rapid rewinding, the idlers 17 and 17' are separated from the rotary guide drum 14 which is kept stationary, while a motor for driving the supply reel is energized.

The apparatus constructed according to this invention (as described above) has the following advantageous characteristics:

(a) Since the idler 17 presses the tape 11 against drum 14, the variations in the tape tension, occurring between reel 12 and idler 17, and the variations in the speed of the reel 12 have substantially no effect on the portion of the tape which is in engagement with the drum 14. Similarly, the idler 17' prevents variations in tape tension and speed on the supply reel 13 side of the drum. In effect, the invention provides a closed loop scan system.

(b) Since the rotary guide drum 14 is large in diameter, the rotational velocity of the drum is low. Accordingly, there is a very low frequency of variations in the angular velocity due to the eccentricities and the like generated at the capstan or otherwise. This is effective to provide an operation such that jitter is greatly decreased. This invention improves the operation of a head servo system, particularly during playback reproduction.

(c) Since the rotary guide drum is large in diameter, even though these may be unavoidable eccentricities and the like in the drum and capstan, the ratio to the outer diameter is small. Accordingly, any jitter which may be generated becomes insignificant.

(d) In comparison to the usual fixed drum system, the total amount of the friction between the drum and the magnetic tape is very small. Accordingly, tape elongation and tape tension are minimized so that any jitter which may be generated becomes very small. Further, there is no unbalance as in a conventional system wherein the tape tension is great on one side of the drum and small on the other side. In the inventive system, the tape is run at nearly the same tension in both sides of the drum. Accordingly, there is no generation of jitter due to the unevenness of the tape drive.

(e) Since the tape tension on the side of the idler 17 is low as compared with the usual system, the slip to be generated in the idler 17 is small. The variations of the tape velocity due to the slip can be prevented. The increase of the partial generation of the jitter involving the variation of the finished condition of the magnetic tape surface can be decreased.

(f) The rotary guide drum 14 serves as a capstan, and the weight of the drum itself provides a flywheel effect. Thus the flywheel conventionally attached on the capstan motor side can be omitted, and the total weight can be decreased. Further, since there is little error of dimension and rotary unbalance caused by the difference in attachment of the conventional flywheel and capstan, the jitter to be generated is decreased.

Figure 4:
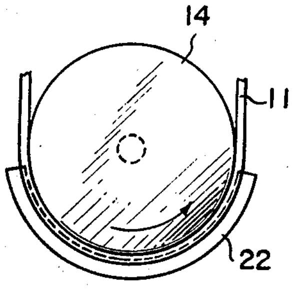
FIG. 4 is a plan view showing a first embodiment of a tape supporting means.
Figures 5, 7, 8, 9, 10, 11:
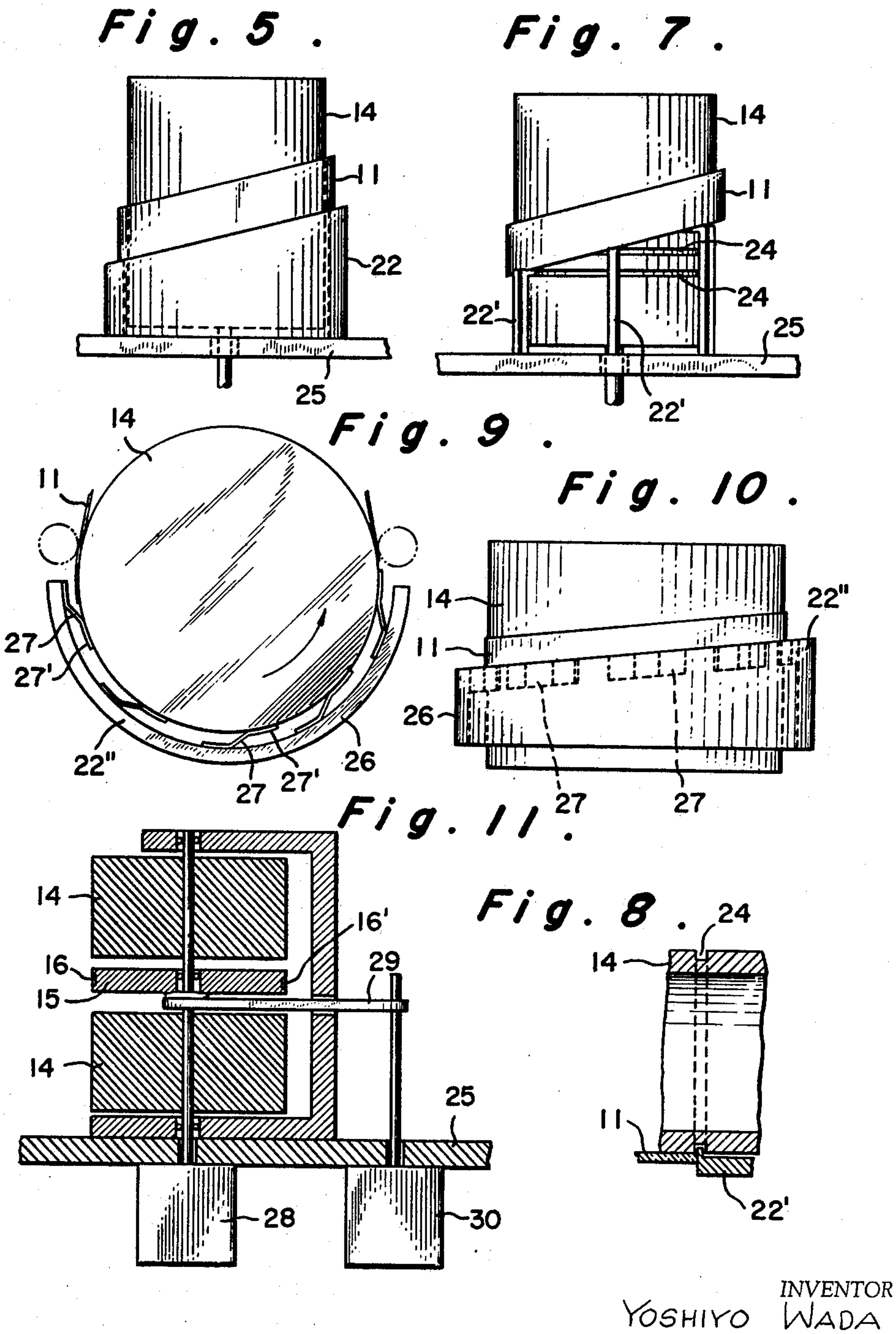
FIG. 5 is a side view of the tape supporting means shown in FIG. 4.
FIG. 7 is a side view of the means shown in FIG. 6.
FIG. 8 is a sectional view taken along the line VIII—VIII of FIG. 6.
FIG. 9 is a plan view showing a third embodiment of a tape supporting means.
FIG. 10 is a side view of the means shown in FIG. 9.
FIG. 11 is a sectional view showing a first embodiment of a driving means for driving a rotary head and a guide drum.

According to a further feature of the invention, the rotary guide drum 14 is arranged to rotate freely inside a concentric circle-shaped guide 22. The gap between the drum and guide is smaller than the thickness of the tape 11. The guide 22 is fixed on a base plate 25. The lower surface of the magnetic tape 11 is supported by the upper surface of said guide 22 as shown in FIGS. 4 and 5. Thus upward and downward vibration of the magnetic tape is generated and tracking aberration with the recording track band is not generated. In the rapid forward feeding and rewinding operations, idlers 17 and 17' are separated from the rotary guide drum 14 and the rotary guide drum 14 is stopped, and only the magnetic tape 11 is advanced. In general, when considering that the magnetic tape runs obliquely across the drum surfaces and that the drum is rotated, it might be assumed that there would be a great amount of upward and downward displacement. However, an easily overlooked factor is that the displacement is determined by the magnitude of the friction generated on the surface of the magnetic tape. When there is a low friction between the magnetic tape and the rotary guide drums, the force acting upwardly or downwardly as described above, can be utilized reversely as a force for preventing the upward and downward vibrations of the magnetic tape. Means for reducing this friction are as follows:

(a) The friction is reduced by forming a thin air layer between the guide and the magnetic tape responsive to a wind pressure generated by the rotary magnetic head while rotating at high speed.

(b) The friction is reduced by using an idler for decreasing the tape tension, and by reducing the force pressing the tape against the drum surfaces.

(c) The drum surfaces are made of a material having low friction characteristics.

Figure 6:
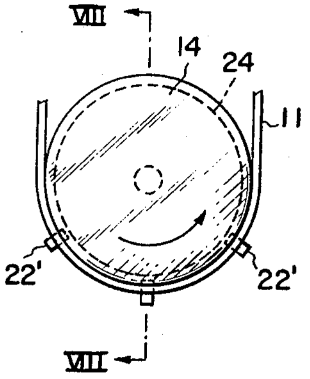
FIG. 6 is a plan view showing a second embodiment of a tape supporting means.

FIGS. 6 and 7 show an arrangement in which a plurality of vertical posts 22' are used in place of the guide 22 for supporting the tape. In this arrangement, as shown in FIG. 8, the upper ends of the posts 22' are formed with portions extending into recesses 24 provided in the rotary guide drum 14 on which the magnetic tape 11 is entrained.

Further, in the above embodiments, it is desirable that the guide be arranged at a suitable distance away from the rotary surfaces of the guide drums. This distance must be smaller than the thickness of the tape, in the approximate order of 5–10$\mu$. Operation is very difficult, however, when dust or the like enters the clearance space between the rotating surfaces of the guide drum and the tape. It is very difficult to remove this dust.

Embodiments shown in FIGS. 9 and 10 remove this defect. The guide 22' is formed by a semi-annular wall body 26 arranged on the outer periphery of the rotary guide drum 14 with a clearance of about 5 mm. This clearance is provided by a plurality of somewhat Z-shaped spring contacting pieces 27 arranged by fixing one of the ends thereof on the opposite side of the wall body 26. The free ends 27' of the contacting pieces 27 are resiliently held in contact with the outer peripheral surfaces of the rotary guide drums 14. Thus, the tape 11 may be guided between the end surfaces of these contacting pieces 27 and the drum. The tape guide constructed in this way has the following merits:

(a) The wall body 26 for supporting the contacting pieces 27 can be held away from the outer periphery of the rotary guide drum 14, with a sufficient spacing so that construction and operation are facilitated.

(b) Since the rotary guide drum 14 and the tape guide 22' are completely separated, the height at which the tape is running can be finely adjusted by changing the position of the tape guide 22'.

(c) During playback, the track of the recorded magnetic tape follows the same path as that which was followed during the recording operation. The reproducing head traces only the recorded track, in the same manner as in the recording operation. Thus, the inclination of the tape guide is the same as it is in the recording operation.

When, for example, a slow motion picture or a stationary picture is to be reproduced, the tape speed is reduced slower than it is during the recording operation. The same track band is thus reproduced many times.

In this case, the locus of the reproduced head is set at an inclination. Thus, reproduction is made by effectively straddling over two track bands as recorded. The difference between the recording and playback tape speeds and the obstacles encountered in so straddling over two track bands produce noise bars in the reproducing picture. In order to prevent this, it is desirable to keep the reproducing head from straddling these two track bands.

For this purpose, one side of the tape guide is arranged to be movable up and down. Thus, the tape can be guided through the tape recorder in such a way that the locus of the recorded track may be traced.

In a usual tape guide, however, it is difficult to carry such guiding action into practice, because of the following reasons:

(1) In an apparatus in which the tape guide is in intimate contact with a rotary guide drum, it is impossible to move this guide.

(2) A stable tape guide action can be maintained if the space between the drum and tape guide is less than the thickness of the tape. When one side of this guide is moved up or down, the tape guide is not in contact with the rotary surfaces of the guide drums. As the contacting pieces 27 are always in contact with the rotary surfaces of the guide drums, the stable tape guide action can be maintained.

(d) Even when dust settles between the rotary surfaces of the guide drums and the contacting pieces 27, the removal thereof is very easy.

(e) When the rotary guide drums 14 are eccentric, or are not completely circular, the distance between the outer peripheral surfaces of the drums and the tape guide may not be uniform. However, since contact pieces 27 are elastic, this non-uniformity can be compensated automatically.

FIGS. 11 to 15 show the various embodiments for driving the rotary magnetic head plate 15 and the rotary guide drum 14 respectively. In FIG. 11, the rotary guide drum

14 is driven directly by a capstan motor 28. The rotary magnetic head plate 15 is driven by a head motor 30 acting through a belt 29.

Figures 12, 13, 14, 15:
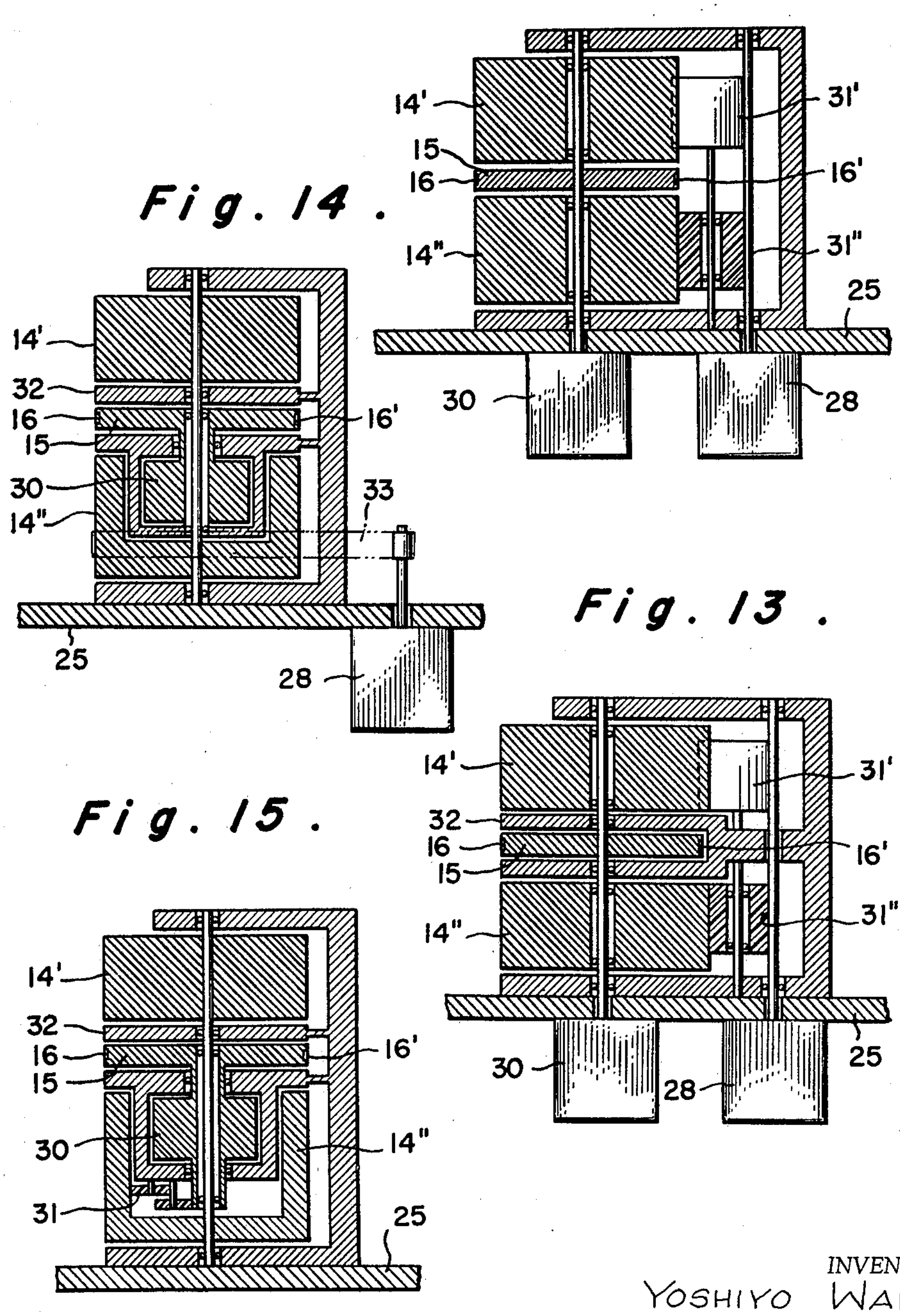
FIG. 12 is a side view showing a second embodiment of a driving means as described above.
FIG. 13 is a side view showing a third embodiment of a driving means as described above.
FIG. 14 is a side view showing a fourth embodiment of a driving means as described above.
FIG. 15 is a side view showing a fifth embodiment of a driving means as described above.

In the embodiment shown in FIG. 12, the rotary magnetic head plate 15 is driven directly by the head motor 30. The upper and lower parts 14' and 14'' of the rotary guide drum 14 are driven independently by the capstan motor 28 acting through idlers 31' and 31'', which have different diameters respectively. When the circumferential speed of the drum 14' on the tape take-up side is greater than the speed of the drum 14'' or the supply side, suitable tape tension can be always put on the opposed drum surface.

In the embodiment shown in FIG. 13, a fixed guide ring 32 is interposed between the rotary magnetic head plate 15 and the upper and lower guide drum portions 14' and 14''. Otherwise, the construction is the same as the construction in FIG. 12. In this way, it is possible to prevent the aberration of the outer periphery of the rotary guide drum portions themselves and the increase of the friction when the tape is wide.

In the embodiment shown in FIG. 14, the head motor 30 is arranged within the rotary guide drum portion 14'' to drive the rotary magnetic head plate directly. The rotary guide drum portion 14'' is driven by the capstan motor 28 acting through a belt 33. The rotary guide drum is used as a capstan. Therefore, even if there is an aberration on the outer periphery of the guide drum, a constant tape running speed can be given to the magnetic tape 11, so long as the capstan belt 33 moves at a constant speed. Since the head motor 30 is inside the drum, the mechanical accuracy of rotation can be increased, and the generation of jitter due to poor mechanical accuracy can be prevented.

In the embodiment shown in FIG. 15, the rotation of the head motor 30 is transmitted to the rotary guide drum portion 14'' via an idler 31. The construction is otherwise the same as in FIG. 14 except that the capstan motor 28 is omitted, so that the construction becomes very simple. The side of the head motor 30 forms a closed loop which is connected directly and mechanically. The generation of the tracking aberration of the tape 11 is small. The tracking aberration accumulates after many hours, but it can be compensated by a minor rotational adjustment of the stator part of the motor 30.

Figure 16:
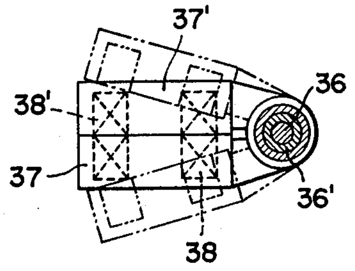
FIG. 16 is a plan view, partly in section, showing armatures of an idler pressing device which is constructed according to this invention.

Next, the support of the idler part in the apparatus according to this invention will be explained with reference to FIGS. 1, 2 and 16.

The idlers 17 and 17' are at the free ends of pivoted arms 34 and 34', respectively, mounted thereat by means of rotary central shafts 35 and 35'. The base portions of the arms 34 and 34' are respectively fixed to a central shaft 36 and an annular shaft 36' into which the shaft 36 is inserted so as to rotate each other freely. To this central shaft 36, and the annular shaft 36' armatures 37 and 37' are connected, respectively, below the base plate 25. Coils 38 and 38' are arranged in the armatures 37 and 37'. An electric current is passed through the coils 38 and 38' in either a positive or negative direction, to cause the armatures 37 and 37' to attract or repel each other.

A connecting rod 39 connects the armature 37 and the central shaft 36 of the arm 34. A similar connecting rod 39' connects directly the armature 37' and the shaft 36' of the arm 34'.

When for example an electrical current is passed in positive direction through coils 38 and 38', the armature 37 and 37' are attracted to each other. Also the arms 34 and 34' connected thereto move in a direction so that they approach each other about the central shaft 36 as a center. The idlers 17 and 17' are then pressed against the outer peripheral surfaces on both sides of the guide drum 14.

Accordingly, even when the guide drums 14 are eccentric, the idlers 17 and 17' swing about the central shaft 36 to follow the eccentricity. There is no change in the pressure exerted against the guide drum. The pressing force occurs responsive to the mutually attractive force of the armatures 37 and 37', and it is averaged and applied to each of the idlers 17 and 17'.

Further, when the shaft 36 of the armature 37 on one side and the armature 37' on the other side are connected by a spring (not shown in the drawing), the pressing force of the mutual idlers 17 and 17' can be adjusted to maintain balance.

In addition, it is sometimes difficult to drive the upper and lower guide drum portions by a common drive and shaft when the magnetic tape, i.e. the magnetic medium, is driven by rotating the guide drum positively, in the apparatus in which the guide drum portions are positioned above and below the rotary magnetic head plate.

Now, an embodiment will be explained in which the guide drum portions are driven by idlers in contact with the outer peripheral surfaces of the guide drum portions.

Figure 17:
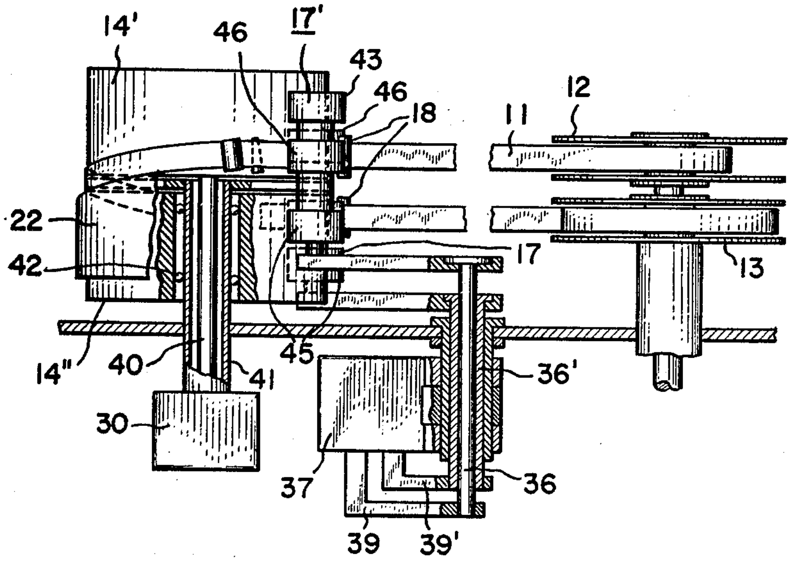
FIG. 17 is a side view, partly in section, showing one embodiment of a drum drive and idler pressing system which is constructed according to this invention.
Figure 18:
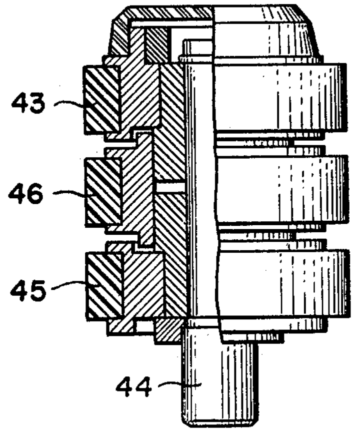
FIG. 18 is an elevational view, partly in section, showing the support of idlers of the system shown in FIG. 17.

In the embodiment shown in FIGS. 17 and 18, the upper guide drum portion 14' is connected with the head motor 30 through a control shaft 40. The head plate 15 is connected with the head motor 30 by an annular shaft 41 which is concentric with central shaft 40, but spaced away from it so as not to be in contact therewith. The lower guide drum portion 14 is fixed freely on the outer periphery of the annular shaft 41 by means of a bearing 42 at the same time, the upper rings 43 of the idlers 17 and 17' are in contact with the outer peripheral surfaces on both sides of the upper guide drum portion 14'. Lower rings 45 are on the same axes as the shafts 44 on which the upper rings 43 are in contact with the outer peripheral surface of the lower guide drum portion 14''. Intermediate rings 46 are arranged to rotate freely on the mid portions of the shafts 44. The construction is such that the intermediate rings 46 may press the tape 11 against either of the guide drum portions 14' or 14''. The poles 23 and 23' compensate the running angle of the tape so that the tape is in a state such that the running direction thereof is in parallel with the rotational direction of the rotary guide drum 14.

Further, the outer peripheral surface of each of the rings 43, 45 and 46 is preferably formed by an elastic body such as a rubber tire, etc.

In this embodiment, when the driving motor 30 is operated, the upper rotary drum portion 14' is rotated by means of the central shaft 40 thereof. This rotation is transmitted to the upper rings 43 of the idlers 17 and 17'. The lower guide drum portion 14'' is also rotated by means of the shaft 44 and lower ring 45.

Further, the intermediate rings 46 are rotated freely by the upper guide drum 14' acting via the magnetic tape 11. In this case the running force is applied to drive the magnetic tape 11 by the pressing force holding the tape against the guide drum portion 14'.

As a result of the construction and operation as described above, various advantages are obtained, as follows:

(a) A capstan and a pinch roller attached thereto are not needed. A pinch roller for guiding the tape and means for serving the function of a capstan are provided, so that the construction is simplified very much.

(b) Since the drum is held between two idlers, even when the drum rotates eccentrically and generates some degree of surface aberration, the contacting pressure between each idler and guide drum is averaged. The generation of rotational slip of the guide drum is prevented and compensated.

(c) In a system in which a capstan shaft is provided and the pinch roller connected therewith is pressed against two guide drums 14' and 14'' independently, unevenness in the pressing force of each pinch roller is liable to be generated. Since there are unavoidable eccentricities of the capstan shaft itself and the aberration of the rotary surface, it is difficult to keep both guide drum portions 14' and 14'' at the same rotational angular velocity.

However in the present invention, the guide drum portion 14'' is rotated directly by the guide drum portion 14' acting via the idler. The amount of the slip therebetween is small and substantially the same rotations can be obtained.

Since the diameter of the rotary drum is large, the part of it which is in contact with the idler has a large area. The amount of the slip becomes small as compared with the transmission of the rotation by a small capstan shaft.

In other apparatus, a higher contacting pressure is needed, because of a small capstan shaft, to prevent the slip while applying the proper torque. The apparatus using the large guide drum of this invention can transmit a force by a small contacting pressure so that there is no necessity for applying a large force.

(d) Since the contacting pressures of the idlers are applied in such a way that they hold the guide drum therebetween, the vector sum of these two forces acts on the guide drum shaft to negate each other. There is no application of any wild force to the guide drum shaft, as compared with the case when the drum is rotated by a single idler with the capstan shaft arranged specially.

(4) By varying the contacting pressures between the upper and lower rings of each idler and the upper and lower guide drum portions, the rotating velocities of the upper and lower guide drum portions may be different from each other and a tension can be applied to the magnetic tape.

Further, this invention is not limited to the embodiment described above, and many modifications of this invention may be made without departing from the spirit of this invention.

I claim as my invention:

1. In apparatus for magnetic recording and reproducing of a video signal or the like on magnetic tape, tape guide drum means including a pair of cylindrical drum portions of the same diameter and on the same axis having adjacent ends spaced apart to define an annular gap, guide roller means including a pair of guide rollers guiding the tape approaching and leaving said drum means so that the running direction of the tape is substantially vertical to said axis, entrained means for entraining the magnetic tape in a helical path about said drum portions to expose an oblique track of said tape at said gap, said entraining means including compensating guide means for compensating the running angle of said tape and guide means for engaging the edge of said tape adjacent to surfaces of said drum portions, at least one magnetic head rotatable in said gap about said axis to engage along said oblique track of said tape, drum drive means for positively rotating said drum portions, said drum drive means including means for rotating said drum portions at different velocities, and tape pressing means for pressing said tape against said drum portions to effect positive drive of said tape by said drum portions.

2. In apparatus for magnetic recording and reproducing as defined in claim 1, one of said drum portions being initially engaged by the tape and having a velocity less than that of the other of said drum portions.

3. In apparatus for magnetic recording and reproducing of a video signal or the like on magnetic tape, tape guide drum means including a pair of cylindrical drum portions of the same diameter and on the same axis having adjacent ends spaced apart to define an annnular gap, guide roller means including a pair of guide rollers guiding the tape approaching and leaving said drum means so that the running direction of the tape is substantially vertically to said axis, entraining means for entraining the magnetic tape in a helical path about said drum portions to expose an oblique track of said tape at said gap, said entraining means including compensating guide means for compensating the running angle of said tape and guide means for engaging the edge of said tape adjacent to surfaces of said drum portions, at least one magnetic head rotatable in said gap about said axis to engage along said oblique track of said tape, drum drive means for positively rotating said drum portions, tape pressing means for pressing said tape against said drum portions to effect positive drive of said tape by said drum portions, said tape pressing means including a pair of idler rollers pressing the tape into engagement with said drum portions at initial and final accurately spaced engagement points, a pair of arms carrying said idler rollers and pivotal on a common axis parallel to said axis of said drum portions, a pair of armatures rigidly connected to said pair of arms, and electro-magnet means for attracting and repelling said armatures toward and away from each other to move said idler rollers toward and away from said drum portions.

4. In apparatus for magnetic recording and reproducing of a video signal or the like on magnetic tape, tape guide drum means including a pair of cylindrical drum portions of the same diameter and on the same axis having adjacent ends spaced apart to define an annular gap, guide roller means including a pair of guide rollers guiding the tape approaching and leaving said drum means so that the running direction of the tape is substantially vertical to said axis, entraining means for entraining the magnetic tape in a helical path about said drum portions to expose an oblique track of said tape at said gap, said entraining means including compensating guide means for compensating the running angle of said tape and guide means for engaging the edge of said tape adjacent to surfaces of said drum portions, at least one magnetic head rotatable in said gap about said axis to engage along said oblique track of said tape, drum drive means for positively rotating said drum portions, tape pressing means for pressing said tape against said drum portions to effect positive drive of said tape by said drum portions, said drum drive means and tape pressing means including means for positively rotating one of said drum portions, and first, second and third idlers in spaced relation on a common axis parallel to said axis of said drum portions, said first idler being pressed into engagement with one of said drum portions, said second idler being connected to said first idler and being pressed into engagement with the other of said drum portions to effect rotation of said other of said drum portions, and said third idler being disposed between said first and second idlers and being pressed into engagement with the tape.

5. In apparatus for magnetic recording and reproducing of a video signal or the like on magnetic tape, tape guide drum means including a pair of cylindrical drum portions of the same diameter and on the same axis having adjacent ends spaced apart to define an annular gap, guide roller means including a pair of guide rollers guiding the tape approaching and leaving said drum means so that the running direction of the tape is substantially vertical to said axis, entraining means for entraining the magnetic tape in a helical path about said drum portions to expose an oblique track of said tape at said gap, said entraining means including compensating guide means for compensating the running angle of said tape and guide means for engaging the edge of said tape adjacent to surfaces of said drum portions, said guide means engaging the edge of the tape comprising a wall body arranged in space relation to outer surface portions of said drum portions, a plurality of guide members of resilient material having ends secured to said wall body and opposite ends resiliently engaged with said drum portions, said members having edges in a spiral path for engaging the edge of the tape and guiding the tape in said helical path, at least one magnetic head rotatable in said gap about said axis to engage along said oblique track of said tape, drum drive means for positively rotating said drum portions, and tape pressing means for pressing said tape against said drum portions to effect positive drive of said tape by said drum portions.

6. In apparatus for magnetic recording and reproducing of a video signal or the like on magnetic tape, tape guide drum means including a pair of cylindrical drum portions of the same diameter and on the same axis having adjacent ends spaced apart to define an annular gap, entraining means for entraining the magnetic tape in a helical path about said drum portions to expose an oblique track of said tape at said gap, at least one magnetic head rotatable in said gap about said axis to engage along said oblique track of said tape, drum drive means for positively rotating said drum portions including means for rotating said drum portions at different velocities, and tape pressing means for pressing said tape against said drum portions to effect positive drive of said tape of said drum portions.

7. In apparatus for magnetic recording and reproducing as defined in claim 6, one of said drum portions being initially engaged by the tape and having a velocity less than that of the other of said drum portions.

8. In apparatus for magnetic recording and reproducing of a video signal or the like on magnetic tape; tape guide drum means including a pair of cylindrical drum portions of the same diameter and on the same axis having adjacent ends spaced apart to define an annular gap, entraining means for entraining the magnetic tape in a helical path about said drum portions to expose an oblique track of said tape at said gap; at least one magnetic head rotatable in said gap about said axis to engage along said oblique track of said tape; drum drive means for positively rotating said drum portions; tape pressing means for pressing said tape against said drum portions to effect positive drive of said tape by said drum portions, including a pair of idler rollers pressing the tape into engagement with said drum portions at initial and final accurately spaced engagement points, a pair of arms carrying said idler rollers and pivotal on a common axis parallel to said axis of said drum portions, a pair of armatures rigidly connected to said pair of arms, and electro-magnet means for attracting and repelling said armatures toward and away from each other to move said idler rollers toward and away from said drum portions.

9. In apparatus for magnetic recording and reproducing of a video signal or the like on magnetic tape, tape guide drum means including a pair of cylindrical drum portions of the same diameter and on the same axis having adjacent ends spaced apart to define an annular gap, entraining means for entraining the magnetic tape in a helical path about said drum portions to expose an oblique track of said tape at said gap, at least one magnetic head rotatable in said gap about said axis to engage along said oblique track of said tape, means for positively rotating one of said drum portions, and first, second and third idlers in spaced relation on a common axis parallel to said axis of said drum portions, said first idler being pressed into engagement with one of said drum portions, said second idler being connected to said first idler and being pressed into engagement with the other of said drum portions to effect rotation of said other of said drum portions, and said third idler being disposed between said first and second idlers and being pressed into engagement with the tape.

10. In apparatus for magnetic recording and reproducing of a video signal or the like on magnetic tape, tape guide drum means including a pair of cylindrical drum portions of the same diameter and on the same axis having adjacent ends spaced apart to define an annular gap; entraining means for entraining the magnetic tape in a helical path about said drum portions to expose an oblique track of said tape at said gap, including a wall body arranged in spaced relation to outer surface portions of said drum portions, and a plurality of guide members of resilient material having ends secured to said wall body and opposite ends resiliently engaged with said drum portions, said members having edges in a spiral path for engaging the edge of the tape and guiding the tape in said helical path; at least one magnetic head rotatable in said gap about said axis to engage along said oblique track of said tape; drum drive means for positively rotating said drum portions; and tape pressing means for pressing said tape against said drum portions to effect positive drive of said tape by said drum portions.

References Cited

UNITED STATES PATENTS

| | | | |
|---|---|---|---|
| 1,825,441 | 9/1931 | Cawley | 178—6.6 |
| 2,349,018 | 5/1944 | Tasker | 179—100.2 |

FOREIGN PATENTS

| | | |
|---|---|---|
| 915,671 | 12/1963 | Great Britain. |
| 39–6,610 | 5/1964 | Japan. |

BERNARD KONICK, Primary Examiner

J. R. GOUDEAU, Assistant Examiner

U.S. Cl. X.R.

178—6.6